United States Patent
Kozlowski

(10) Patent No.: US 6,999,635 B1
(45) Date of Patent: Feb. 14, 2006

(54) METHOD OF REDUCING BACKGROUND NOISE BY TRACKING CHARACTER SKEW

(75) Inventor: William L. Kozlowski, Novi, MI (US)

(73) Assignee: Unisys Corporation, Blue Bell, PA (US)

(*) Notice: Subject to any disclaimer, the term of this patent is extended or adjusted under 35 U.S.C. 154(b) by 731 days.

(21) Appl. No.: 10/137,048

(22) Filed: May 1, 2002

(51) Int. Cl.
*G06K 9/36* (2006.01)

(52) U.S. Cl. .................. 382/289; 356/138; 702/150

(58) Field of Classification Search ........... 382/100, 382/137, 139, 140, 289, 321; 705/45; 713/700; 702/150, 151
See application file for complete search history.

(56) References Cited

U.S. PATENT DOCUMENTS

| | | | | |
|---|---|---|---|---|
| 4,408,342 A | * | 10/1983 | Grabowski et al. | 382/140 |
| 4,741,045 A | * | 4/1988 | Denning | 382/178 |
| 4,926,490 A | * | 5/1990 | Mano | 382/177 |
| 5,325,447 A | * | 6/1994 | Vogt, III | 382/102 |
| 5,781,660 A | * | 7/1998 | Nitta et al. | 382/177 |
| 6,038,342 A | * | 3/2000 | Bernzott et al. | 382/173 |

* cited by examiner

*Primary Examiner*—Samir Ahmed
*Assistant Examiner*—Anand Bhatnagar
(74) *Attorney, Agent, or Firm*—Lise A. Rode; Mark T. Starr; Brooks Kushman P.C.

(57) ABSTRACT

A method of reducing background noise during optical character recognition includes conducting a first recognition pass over image data at a sequence of character positions to frame and recognize a first set of characters while a second set of characters remains unrecognized. Character skew is tracked based on the first recognition pass. The image data is modified to remove background noise based on the tracked character skew. A second recognition pass is conducted over the modified image data at the sequence of character positions to frame and recognize the second set of characters.

10 Claims, 3 Drawing Sheets

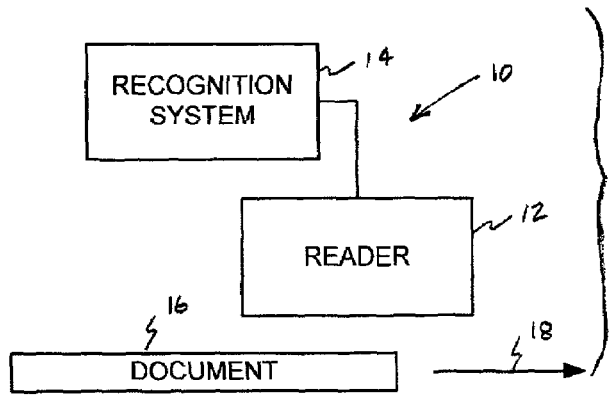
FIG. 1
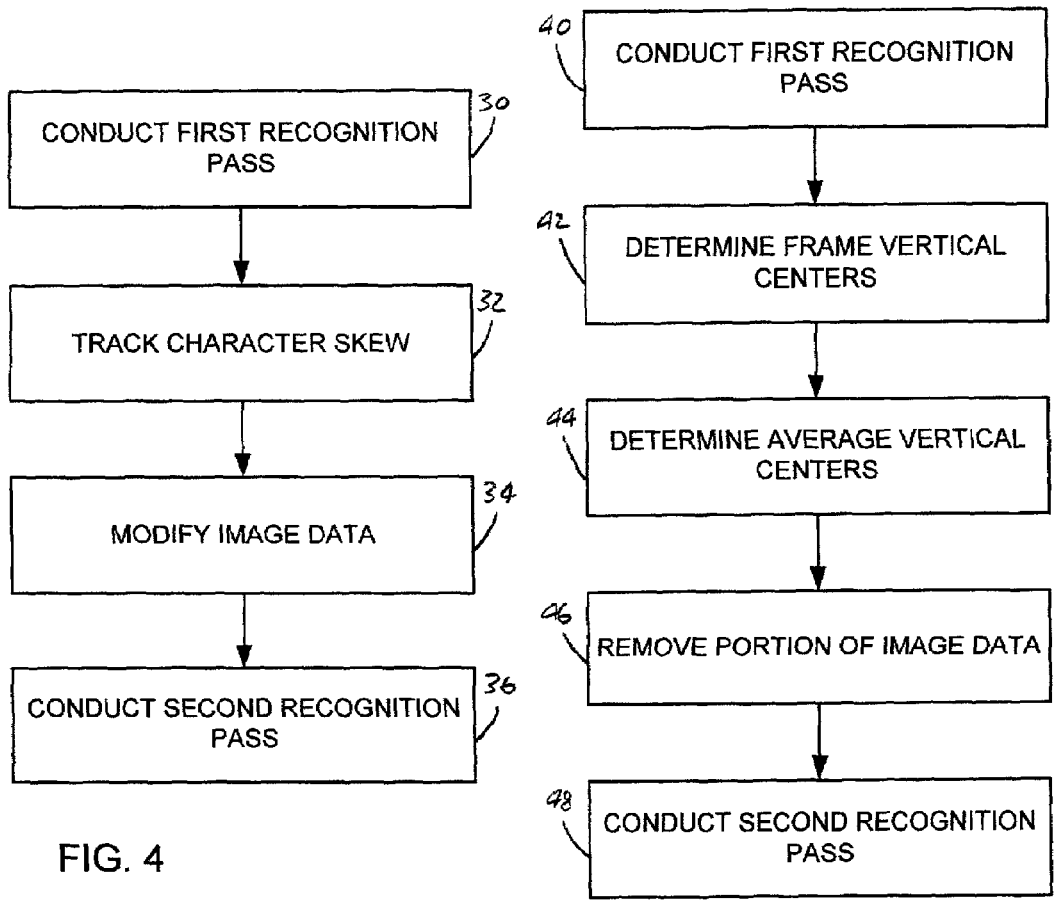
FIG. 4
FIG. 5

| CHARACTER NUMBER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| FIRST PASS | A | 0 | 0 | 0 | 0 | 3 | 4 | ? | 0 | 0 | 0 | A | | 7 | 8 | | | |
| VERT. CENTER | 25 | 25 | 26 | 27 | 27 | 28 | 29 | ? | 30 | 30 | 31 | 31 | | 28 | 28 | | | |
| SUM | 130 | 158 | 187 | 187 | 217 | 222 | 228 | 233 | 206 | 207 | 207 | 178 | 178 | 148 | 118 | 87 | 56 | 56 |
| TOTAL ENTRIES | 5 | 6 | 7 | 7 | 8 | 8 | 8 | 8 | 7 | 7 | 7 | 6 | 6 | 5 | 4 | 3 | 2 | 2 |
| AVE. VERT. CENTER | 26 | 26 | 27 | 27 | 27 | 28 | 29 | 29 | 29 | 30 | 30 | 30 | 30 | 30 | 30 | 29 | 28 | 28 |
| BOTTOM | 5 | 5 | 6 | 6 | 6 | 7 | 8 | 8 | 8 | 9 | 9 | 9 | 9 | 9 | 9 | 8 | 7 | 7 |
| TOP | 47 | 47 | 48 | 48 | 48 | 49 | 50 | 50 | 50 | 51 | 51 | 51 | 51 | 51 | 51 | 50 | 49 | 49 |
| SECOND PASS | A | 0 | 0 | 0 | 0 | 3 | 4 | 8 | 0 | 0 | 0 | A | | 7 | 8 | | | |

FIG. 3

METHOD OF REDUCING BACKGROUND NOISE BY TRACKING CHARACTER SKEW

BACKGROUND OF THE INVENTION

1. Field of the Invention

The present invention relates to optical character recognition systems, and to methods of reducing background noise.

2. Background Art

Optical character recognition (OCR) is the optical reading of image data from a document followed by passing over the image data with a recognition system. The recognition system reads characters of a character code line by framing and recognizing the characters within the image data. An existing recognition system is the single pass recognition system that attempts to frame and recognize characters within the image data from the document in a single pass. The single pass recognition system often will read a character and then discard the corresponding image data to make room for the next part of the image data.

A significant problem inherent with optical character recognition (OCR) systems including the existing single pass recognition system arises in the presence of background noise such as borders and background pen marks. Background noise may result in incorrect framing, leading to incorrect recognition. That is, background noise may be mistakenly framed as the character instead of the actual character being framed. Incorrect framing is possible because image data from a read zone or scan band containing the character code line is sent to the recognition system without knowing the position of the characters within the image data.

More specifically, in an OCR system image data from a read zone or scan band of a fixed size is passed to the recognition system to allow the determination of the characters on the document. The scan band is established so that all characters on a single line of text on the document are contained in the image data which takes the form of an image data stream. This stream of image data often contains background noise and borders produced by printing details or pen marks from signatures and other handwritten notations. Noise reduces the single pass recognition system's ability to locate and frame the true code line characters contained in the image data.

For the foregoing reasons, there is a need for a method of reducing background noise to yield a higher percentage of properly framed characters.

SUMMARY OF THE INVENTION

It is, therefore, an object of the present invention to provide a method of reducing background noise by tracking character skew that uses a two-pass recognition system to improve framing and recognition results.

In carrying out the above object, a method of reducing background noise during optical character recognition is provided. During optical character recognition, a scan band of image data is optically read from a document and the image data is passed to a recognition system. The image data includes data at a plurality of character positions that form a sequence. The method includes conducting a first recognition pass over the image data at the sequence of character positions to frame and recognize a first set of characters while a second set of characters remains unrecognized. The method further includes tracking character skew based on the first recognition pass, and modifying the image data to remove background noise based on the tracked character skew. A second recognition pass is conducted over the modified image data at the sequence of character positions to frame and recognize the second set of characters.

In a preferred embodiment, tracking character skew further comprises determining a plurality of frame vertical centers based on the first recognition pass. More preferably, tracking character skew further comprises determining frame vertical centers for character positions corresponding to the first set of characters based on the first recognition pass. An average vertical center is determined for each character position. The average vertical center for a specific character position is based on any determined frame vertical center for that specific character position and for a limited range of character positions about that specific character position.

Further, in the preferred embodiment, modifying further comprises, for each character position, retaining image data that falls within a limited distance in either direction from the corresponding average vertical center while removing image data that falls outside the limited distance in either direction from the corresponding average vertical center.

Preferably, image data falling within ¾ of a character height in either direction from the corresponding average vertical center is retained while image data that falls outside ¾ of a character height in either direction from the average vertical center is removed.

Further, in carrying out the present invention, a system including a reader and a recognition system is provided. The recognition system is programmed to perform a method of reducing background noise during optical character recognition in which a scan band of image data is optically read from a document and the image data is passed to the recognition system. The image data includes data at a plurality of character positions that form a sequence. The recognition system is further programmed to conduct a first recognition pass over the image data at the sequence of character positions to frame and recognize a first set of characters while a second set of characters remains unrecognized. The recognition system is further programmed to track character skew based on the first recognition pass, and modify the image data to remove background noise based on the tracked character skew. A second recognition pass is conducted over the modified image data at the sequence of character positions to frame and recognize the second set of characters.

In a preferred embodiment, tracking character skew further comprises determining a plurality of frame vertical centers based on the first recognition pass. More preferably, tracking character skew further comprises determining frame vertical centers for character positions corresponding to the first set of characters based on the first recognition pass. An average vertical center is determined for each character position. The average vertical center for a specific character position is based on any determined frame vertical center for that specific character position and for a limited range of character positions about that specific character position.

Further, in the preferred embodiment, modifying further comprises, for each character position, retaining image data that falls within a limited distance in either direction from the corresponding average vertical center while removing image data that falls outside the limited distance in either direction from the corresponding average vertical center.

Preferably, image data that falls within ¾ of a character height in either direction from the corresponding average vertical center is retained while image data that falls outside ¾ of a character height in either direction from the average vertical center is removed.

The advantages associated with embodiments of the present invention are numerous. For example, some characters are recognized during the first recognition pass, and tracking character skew allows the image data to be modified to remove background noise prior to conducting a second recognition pass over the modified image data. The reduction in image data sent to the framer often allows characters to be framed and recognized instead of background noise.

The above object and other objects, features, and advantages of the present invention are readily apparent from the following detailed description of the preferred embodiment when taken in connection with the accompanying drawings.

BRIEF DESCRIPTION OF THE DRAWINGS

FIG. 1 is a system of the present invention including a reader and a recognition system programmed to perform a method of reducing background noise during optical character recognition;

FIG. 3 is a table containing data generated in carrying out a preferred method of the present invention on the character sequence illustrated in FIGS. 2A–2B;

FIG. 4 is a block diagram illustrating a method of the present invention; and

FIG. 5 is a block diagram illustrating a preferred embodiment of a method of the present invention.

DETAILED DESCRIPTION OF THE PREFERRED EMBODIMENT

FIG. 1 illustrates a system of the present invention at 10. System 10 includes a reader 12 and a recognition system 14. Reader 12 optically reads a scan band of image data from a document 16 that moves past reader 12 as indicated by arrow 18. The scan band of image data is passed to recognition system 14. The image data includes data at a plurality of character positions that form a sequence such as the sequence example shown in FIGS. 2A–2B. The exemplary sequence includes magnetic ink character recognition (MICR) characters. In certain applications, the MICR characters may be both magnetically and optically read. Embodiments of the present invention pertain to the optical reading of these MICR characters. In addition, embodiments of the present invention are suitable for reading other types of characters where the characters may be optically read to produce a scan band of image data and where the characters sometimes skew.

Figure 2A:
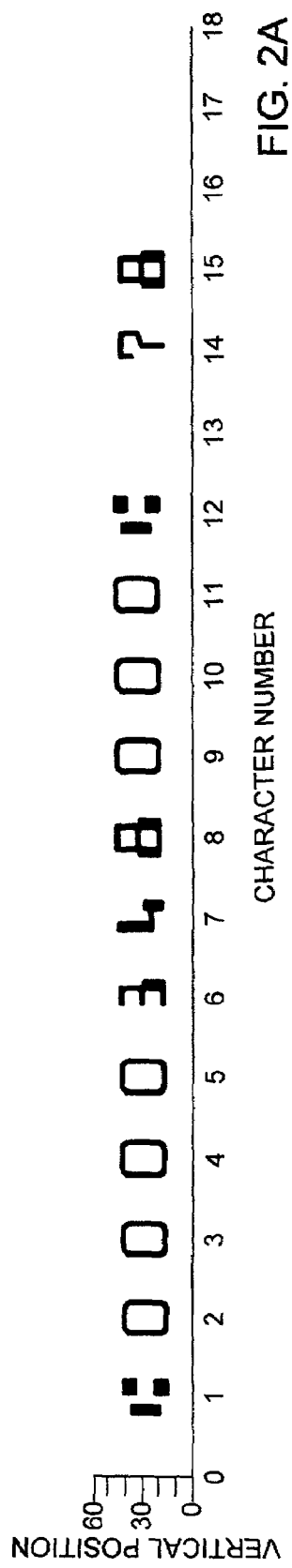
FIG. 2A is a graph depicting a plurality of characters in which the characters are skewed in that the vertical center drifts throughout the sequence of characters.
Figure 2B:
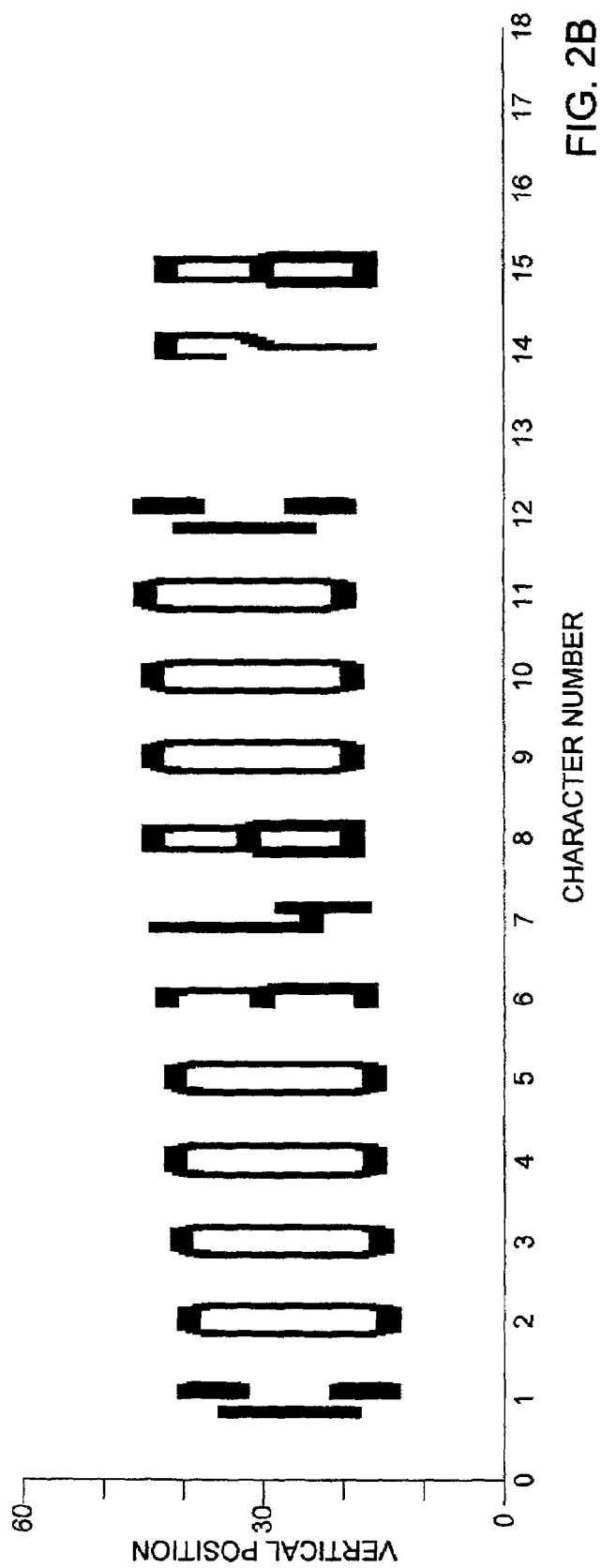
FIG. 2B illustrates the plurality of characters with the Y-axis stretched to better illustrate the character skew or vertical drift.

Character skew refers to the vertical drifting of the character frame vertical centers throughout the sequence of characters. As shown in FIGS. 2A–2B, and as best observed in FIG. 2B, the characters skew slightly upward and then back downward with the vertical center drifting from vertical position 25 up to vertical position 31 and back down to vertical position 28.

Because of character skew, the scan band containing the character code line is sent to the recognition system without knowing the position of the characters within the image data. That is, the character centers may skew or drift from the center of the scan band.

Embodiments of the present invention conduct a first recognition pass over the image data and then modify the image data based on detected character skew. A second recognition pass is conducted over the modified image data. Specifically, the image data is modified by tracking character skew and removing image data that is most likely background noise. It is appreciated that the tracking of character skew and the modifying of the image data to remove background noise may be implemented in a variety of different ways. FIG. 3 is a table illustrating a preferred implementation of tracking and modifying the image data for the character sequence shown in FIGS. 2A–2B.

FIG. 4 generally describes a method of the present invention for reducing background noise during optical character recognition utilizing a two-pass technique to improve framing results. At block 30, a first recognition pass is conducted over the image data at the sequence of character positions (FIGS. 2A–2B) to frame and recognize a first set of characters while a second set of characters remains unrecognized. That is, the first pass of the recognition system over the data reads a preliminary code line from the document. The preliminary code line may have one or more unrecognized characters. However, this first recognition pass will likely yield a significant amount of correctly framed and recognized characters. These correctly framed and recognized characters provide a basis for tracking character skew and modifying the image data prior to conducting the second recognition pass.

At block 32, character skew is tracked. Character skew or the vertical drifting of framed vertical centers over the sequence of character positions is tracked based on the first recognition pass so that character skew for characters recognized on the first pass may be used to estimate character skew for characters not recognized on the first pass. For example, a best fit curve passing through known vertical centers for framed and recognized characters from the first pass may be used to predict frame vertical centers at character positions where a character was not recognized. Equivalently, character skew may be tracked based on character top edges or bottom edges as opposed to frame vertical centers.

At block 34, the image data is modified to remove background noise based on the tracked character skew. That is, because tracking character skew serves as a suitable predictor of the location of vertical frame centers for characters not recognized in the first pass, only image data within a limited distance of either side of the predicted center is saved for recognition analysis in the second pass. At block 36, the second recognition pass is conducted over the modified image data at the sequence of character positions to frame and recognize the second set of characters.

FIG. 5 illustrates a preferred embodiment of the present invention. The preferred method illustrated in FIG. 5 is best understood with simultaneous reference to FIGS. 2A–2B, 3 and 5. At block 40, the first recognition pass is conducted. At block 42, frame vertical centers are determined based on the first recognition pass. As shown in FIG. 3, the first pass recognizes all characters except for character number 8 where the table indicates a "?" in the first pass line of the table. FIG. 3 also shows determined frame vertical centers for all characters recognized in the first pass, again with a "?" for character number 8. The vertical center positions in the table of FIG. 3 correspond to the character sequence of FIGS. 2A–2B. At block 44, average vertical centers are determined. More specifically, for each character position, an average vertical center is determined. This is a way to track character skew. The average vertical center for preferred embodiments of the present invention for a specific character position is based on any determined frame vertical center for that specific character position and for a limited range of character positions about that specific character position. That is, a specific character number has an average vertical center based on its own measured center and the centers of nearby characters. In the example illustrated in the table of FIG. 3, average vertical center calculations are determined as follows.

The vertical center of each character frame from the first pass yielding a valid character recognition is stored in an array. This array is then used to create bottom and top limits for a re-pass of the character image (the second pass). The new bottom and top limits are preferably created for every character position in the document. For each recognized character from the first pass, the character center is added to an array (sum line in FIG. 3) for each character position falling within a specified limit from itself. In the example implementation shown in FIG. 3, the number of character positions from itself is 5 (including itself). This means that the table line labeled "sum" for each character number is the sum of all measured vertical centers up to 4 positions away from a particular character number (up to 9 centers may be added together to create the sum). The total entries line of the table indicates the number of vertical centers added together to produce the sum. The average vertical center line of the table is the sum divided by the total entries. This average vertical center is used to create the new bottom and top limits for the second pass.

At block 46, a portion of the image data is removed. In the example, the average character center is used to create bottom and top limits by taking ½ the average character height plus a margin of error of ¼ of the average character height, and adding and subtracting this value from the average vertical center for each position. If no average vertical center is found for a particular character position (not illustrated), then the bottom and top limits are kept wide open so that no image data is thrown out for that specific character position. In the example, the average character height is 28 units (on the Y-axis of FIGS. 2A–2B) yielding a ½ character height of 14 units and a ¼ character height of 7 units. That is, the bottom and top limits are determined by subtracting and adding 21 units from the average vertical center, respectively. At block 48, a second recognition pass is conducted.

The new bottom and top limits eliminate character segments outside the boundary of previously recognized and unrecognized characters. This reduction in image data sent to the framer often allows actual characters to be framed instead of background noise. In the example, the character at character number 8 (which is an "8") is correctly framed and recognized in the second pass.

It is appreciated that the above description and data table illustrate a preferred method for tracking character skew, modifying image data, and conducting the second recognition pass. It is appreciated that embodiments of the present invention may employ any suitable technique for tracking character skew and modifying the image data. For example, character skew may be tracked based on frame vertical centers, or the bottoms or tops of characters. Further, the averaging technique described herein for averaging vertical centers for recognized and unrecognized character positions is exemplary. Any suitable technique can be utilized for determining a best fit character skew track through the sequence of characters. Further, modifying the image data based on the tracked character skew may be implemented in a number of ways and the technique for determining new bottom and top limits described herein is exemplary. Although a straightforward approach of discarding all image data not within ¾ of the average character height from the average vertical center is suitable for some implementations, other techniques may be utilized for modifying the image data that are more complex. For example, tighter bottom and top limits may be utilized when the confidence level for the average vertical center is greater, while more wide open bottom and top limits are utilized when the confidence in the average vertical center is lower.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of reducing background noise during optical character recognition in which a scan band of image data is optically read from a document and the image data is passed to a recognition system, the image data including data at a plurality of character positions that form a sequence, the method comprising:

conducting a first recognition pass over the image data at the sequence of character positions to frame and recognize a first set of characters while a second set of characters remains unrecognized;

tracking character skew based on the first recognition pass, the tracked character skew being indicative of vertical drifting of framed characters over the sequence of character positions;

modifying the image data to remove background noise based on the tracked character skew; and conducting a second recognition pass over the modified image data at the sequence of character positions to frame and recognize the second set of characters.

2. The method of claim 1 wherein tracking character skew further comprises:

determining a plurality of frame vertical centers based on the first recognition pass.

3. The method of claim 2 wherein tracking character skew further comprises:

determining frame vertical centers for character positions corresponding to the first set of characters based on the first recognition pass; and determining an average vertical center for each character position wherein the average vertical center for a specific character position is based on any determined frame vertical center for that specific character position and for a limited range of character positions about that specific character position.

4. The method of claim 3 wherein modifying further comprises:

for each character position, retaining image data that falls within a limited distance in either direction from the corresponding average vertical center while removing image data that falls outside the limited distance in either direction from the corresponding average vertical center.

5. The method of claim 3 wherein modifying further comprises:

for each character position, retaining image data that falls within ¾ of a character height in either direction from the corresponding average vertical center while removing image data that falls outside ¾ of a character height in either direction from the average vertical center.

6. A system including a reader and a recognition system programmed to perform a method of reducing background noise during optical character recognition in which a scan band of image data is optically read from a document and the image data is passed to the recognition system, the image data including data at a plurality of character positions that form a sequence, the recognition system being programmed to:
   conduct a first recognition pass over the image data at the sequence of character positions to frame and recognize a first set of characters while a second set of characters remains unrecognized;
   track character skew based on the first recognition pass, the tracked character skew being indicative of vertical drifting of framed characters over the sequence of character positions;
   modify the image data to remove background noise based on the tracked character skew; and
   conduct a second recognition pass over the modified image data at the sequence of character positions to frame and recognize the second set of characters.

7. The system of claim 6 wherein tracking character skew further comprises:
   determining a plurality of frame vertical centers based on the first recognition pass.

8. The system of claim 7 wherein tracking character skew further comprises:
   determining frame vertical centers for character positions corresponding to the first set of characters based on the first recognition pass; and
   determining an average vertical center for each character position wherein the average vertical center for a specific character position is based on any determined frame vertical center for that specific character position and for a limited range of character positions about that specific character position.

9. The system of claim 8 wherein modifying further comprises:
   for each character position, retaining image data that falls within a limited distance in either direction from the corresponding average vertical center while removing image data that falls outside the limited distance in either direction from the corresponding average vertical center.

10. The system of claim 8 wherein modifying further comprises:
   for each character position, retaining image data that falls within ¾ of a character height in either direction from the corresponding average vertical center while removing image data that falls outside ¾ of a character height in either direction from the average vertical center.

* * * * *